United States Patent
Kitagawa

(10) Patent No.: US 6,680,709 B2
(45) Date of Patent: Jan. 20, 2004

(54) ANTENNA APPARATUS

(75) Inventor: Toshiya Kitagawa, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/059,307

(22) Filed: Jan. 31, 2002

(65) Prior Publication Data

US 2002/0109637 A1 Aug. 15, 2002

(30) Foreign Application Priority Data

Feb. 9, 2001 (JP) ........................................ 2001-033405

(51) Int. Cl.[7] .............................................. H01Q 11/12
(52) U.S. Cl. ........................ 343/742; 343/842; 343/867
(58) Field of Search ................................ 343/742, 867, 343/741, 744, 743, 842, 866; 340/572

(56) References Cited

U.S. PATENT DOCUMENTS

| 4,243,980 A | | 1/1981 | Lichtblau | 343/742 |
|---|---|---|---|---|
| 4,866,455 A | | 9/1989 | Lichtblau | 343/742 |
| 4,872,018 A | * | 10/1989 | Feltz et al. | 343/742 |
| 4,972,198 A | * | 11/1990 | Feltz et al. | 343/742 |
| 4,999,641 A | * | 3/1991 | Cordery et al. | 343/742 |
| 5,061,941 A | * | 10/1991 | Lizzi et al. | 343/742 |
| 5,103,235 A | * | 4/1992 | Clemens | 343/742 |
| 5,126,749 A | * | 6/1992 | Kaltner | 343/742 |
| 5,373,301 A | * | 12/1994 | Bowers et al. | 343/742 |
| 5,440,296 A | * | 8/1995 | Nelson | 340/572 |
| 5,663,738 A | * | 9/1997 | Mueller | 343/742 |
| 5,963,173 A | * | 10/1999 | Lian et al. | 343/742 |
| 6,166,706 A | * | 12/2000 | Gallagher, III et al. | 343/867 |

* cited by examiner

Primary Examiner—Hoang V. Nguyen
(74) Attorney, Agent, or Firm—Dickstein Shapiro Morin & Oshinksy, LLP

(57) ABSTRACT

There is provided an antenna apparatus in which a non-detection region is made minimum within the regulatory limit of radio wave radiation, and satisfactory communication is enabled over a wide range. Four substantially square antennas are adjacently arranged on the same plane to constitute an antenna assembly, which is arranged to be opposite to a similar antenna assembly. Reverse phase currents flow to the first antenna and the third antenna, and similarly, reverse phase currents flow to the second antenna and the fourth antenna. The second and the fourth antennas are subjected to phase inversion for every data communication between a pattern 1 in which same phase currents flow to the second antenna and the third antenna and a pattern 2 in which same phase currents flow to the first antenna and the second antenna. A predetermined phase difference is provided between the first and the second antenna assemblies.

25 Claims, 5 Drawing Sheets

ANTENNA APPARATUS

BACKGROUND OF THE INVENTION

1. Field of the Invention

The present invention relates to an antenna apparatus for carrying out non-contact data communication with a tag provided with an antenna and an IC chip including a memory through an induction field, and particularly to a gate type antenna apparatus in which two antennas having the same shape are arranged to be opposite to each other.

2. Description of the Related Art

A non-contact RF tag is formed of a coil antenna and an IC chip having a built-in nonvolatile memory, and has attracted attention as a recognition technique substituting for a bar code in a system in which data communication with an antenna apparatus generating an induction field is carried out by wireless. In the non-contact tag as stated above, since a power supply for an IC chip operation is extracted from the induction field generated by the antenna, a battery is not needed.

A loop antenna is used for the antenna apparatus, and various antenna shapes are formed according to its use methods and places.

A gate type antenna apparatus in which two antennas having the same shape are arranged to be opposite to each other has been used for an automatic read apparatus at a conventional security gate for preventing shoplifting or at conveyer transfer, or for a read apparatus for warehousing and shipping management of articles, or the like.

The gate type antenna apparatus used for such objects is requested to read the non-contact RF tag in a detection zone, which is interposed between gates, independent of its position and direction, and it is necessary to realize this by a restricted radio wave output within radio law regulations. In order to satisfy the contradictory requests, in a conventional shoplifting preventing system using a radio wave, various configurations of gate type antennas have been proposed. For example, an antenna 100 called a figure-of-eight type antenna shown in FIG. 6 has a configuration including two loop antennas 101 and 102 having the same shape on the same plane, and by feeding reverse phase currents (currents flow in the directions of arrows) to the respective loops, electromagnetic fields can be approximatively cancelled out at a remote place which becomes problematic in the radio wave regulations, and by this, an output higher than that of a single loop antenna can be injected, and consequently, the induction field of the detection zone in the vicinity of the antenna can be intensified. Besides, in U.S. Pat. No. 4,243,980 and U.S. Pat. No. 4,866,455, an expansion type antenna of such a figure-of-eight type antenna is disclosed.

However, in the case where the foregoing figure-of-eight type antenna configuration or its expansion type is applied to the gate type antenna apparatus of the non-contact RF tag, a non-detection region due to the reverse phase currents comes into existence widely according to the direction of the non-contact RF tag, and there is a problem that the request can not be sufficiently satisfied. That is, as shown in FIG. 7, in the case where the non-contact RF tag 103 is opposite to the plane of the antenna 100, the outputs of radio waves are cancelled by an intersecting portion of the antenna, and a non-detection region 104 comes into existence. However, since the conventional tag for preventing shoplifting does not include an IC chip and merely has a function of detecting the existence of the coil, as compared with the non-contact tag requiring an output higher than a certain intensity so as to operate the IC chip, the detection sensitivity is very high, the non-detection region is very narrow, and a problem in practical use does not arise.

SUMMARY OF THE INVENTION

The present invention has been made to solve the foregoing problems of the prior art, and an object of the invention is to provide an antenna apparatus in which a non-detection region is made minimum within the regulatory limit of radio wave radiation, and satisfactory communication over a wide range is enabled.

In order to achieve the above object, according to the present invention, an antenna apparatus comprises a first antenna assembly and a second antenna assembly arranged to be opposite to each other, and carries out non-contact data communication with a data carrier, and is characterized in that each of the first and the second antenna assemblies includes a first, a second, a third, and a fourth antennas arranged to be adjacent to each other on a substantially same plane, and the antenna apparatus comprises control means for controlling so that currents flowing to the first antenna and the third antenna have phases reverse to each other, currents flowing to the second antenna and the fourth antenna have phases reverse to each other, and the phases of the currents flowing to the first antenna and the third antenna, or to the second antenna and the fourth antenna are inverted at a predetermined timing corresponding to the data communication.

As stated above, since the reverse phase currents are always made to flow between the first and the third antennas and between the second and the fourth antennas, similarly to the conventional figure-of-eight type antenna, radio wave radiation at a remote place becomes minimum, and the intensity of an induction field in the vicinity of the antenna can be intensified. Besides, since the phases of the currents flowing to the first antenna and the third antenna, or to the second antenna and the fourth antenna are inverted at the predetermined timing corresponding to the data communication, a non-detection region coming into existence in the vicinity of a position where the antennas intersect with each other is complemented in time and the non-detection region can be removed.

Besides, it is preferable to provide inductance addition means for adding an inductance equal to a mutual inductance between the second antenna and the third antenna.

By doing so, mutual couplings between antennas, which occur in the case where the four antennas are arranged adjacently, are cancelled, and power feeding to the antenna apparatus can be efficiently carried out in any phase condition.

Besides, it is preferable that the control means provides a predetermined phase difference between the first antenna assembly and the second antenna assembly.

By doing so, a rotating induction field can be generated in a region between the first and the second antenna assemblies arranged to be opposite to each other, and communication with data carriers existing in all directions in this region can be carried out.

Besides, each of the first, the second, the third, and the fourth antennas is a substantially rectangular loop antenna, and they may be arranged so that sides of adjacent rectangles become substantially parallel to each other.

DETAILED DESCRIPTION OF THE PREFERRED EMBODIMENTS

Hereinafter, the present invention will be described on the basis of illustrated embodiments.

Figure 1:
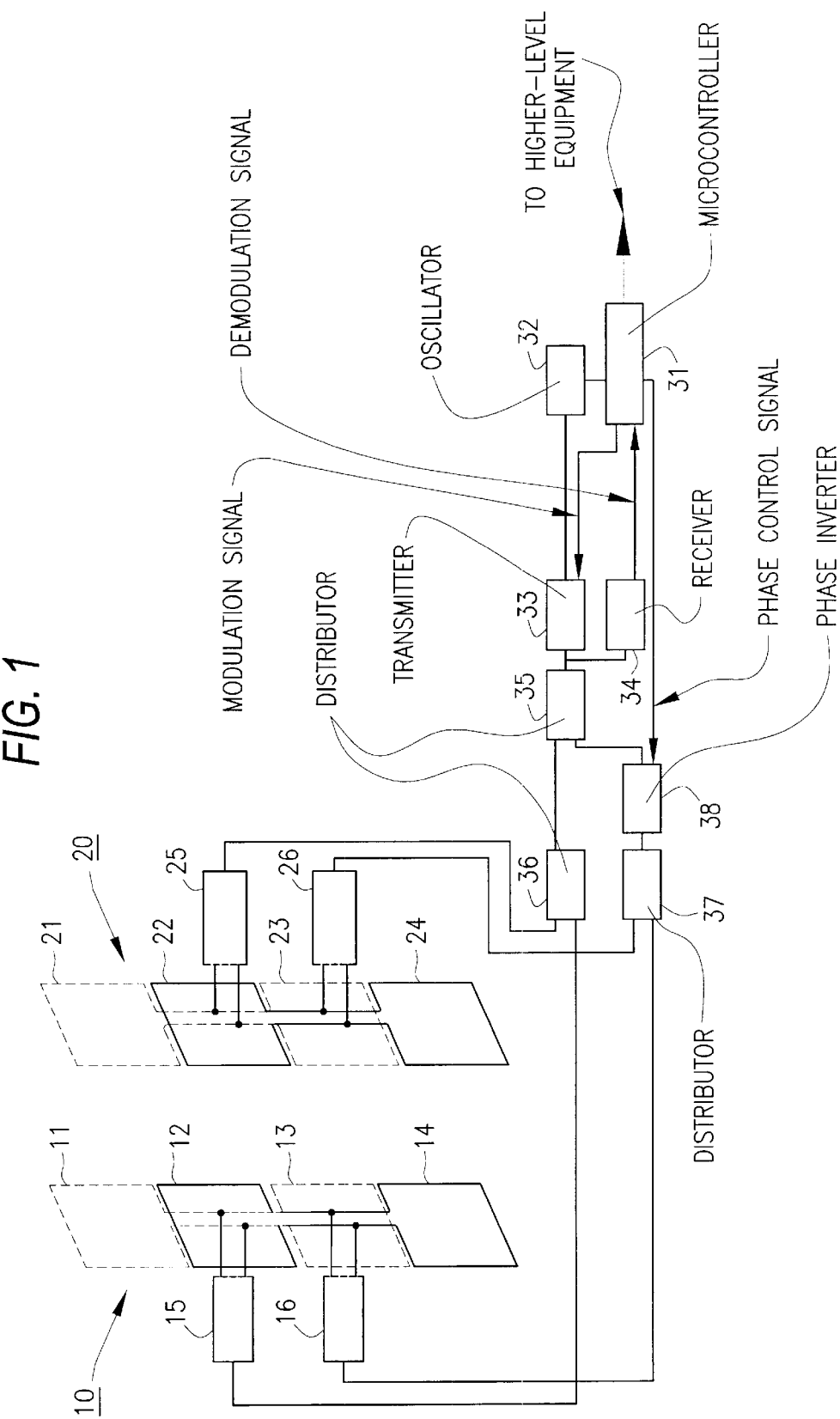
FIG. 1 is a block diagram showing the whole constitution of an antenna apparatus of the present invention.

FIG. 1 is a view showing the whole constitution of an antenna apparatus of the present invention.

Antenna assemblies 10 and 20, each of which is formed of four substantially square loop antennas arranged on the substantially same plane, are arranged to be opposite to each other.

Figure 2:
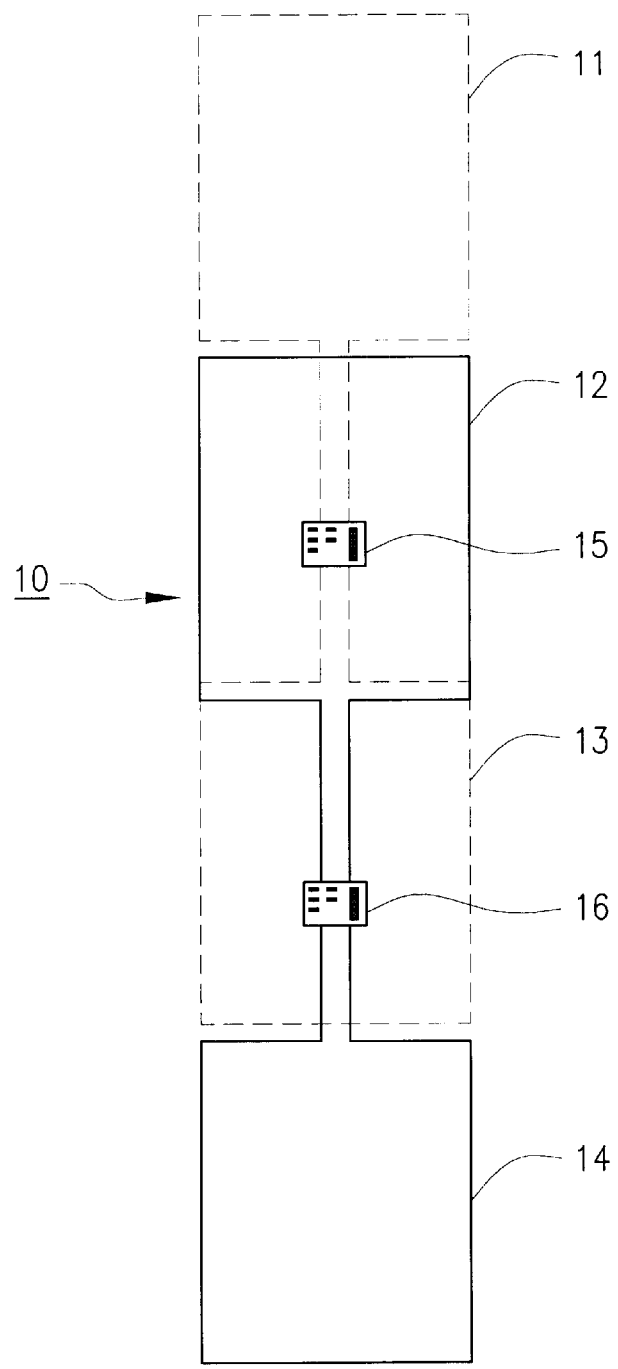
FIG. 2 is a view showing a structure of a first antenna assembly.

FIG. 2 shows a structure of the first antenna assembly 10.

The first antenna assembly 10 has such a structure that a first and a third antennas 11 and 13, in each of which both end portions of a coil bent like a substantially square loop shape extend from a substantially center point of a side of the substantially square shape in parallel to each other along a center line toward the outside and are connected to a matching circuit 15, are arranged on the same plane and at opposite sides of a terminal connected to the matching circuit 15, and similarly a second and a fourth antennas 12 and 14, in each of which both end portions of a coil bent like a substantially square loop shape extend from a substantially center point of a side of the substantially square shape in parallel with each other along a center line toward the outside and are connected to a matching circuit 16, are arranged on the same plane and at opposite sides of a terminal connected to the matching circuit 16, and further, the first antenna 11, the second antenna 12, the third antenna 13, and the fourth antenna 14 are arranged in this order on the same plane such that sides of the substantially square shapes are adjacent to each other.

Similarly, the second antenna assembly 20 has such a structure that a first and a third antennas 21 and 23, in each of which both end portions of a coil bent like a substantially square loop shape extend from a substantially center point of a side of the substantially square shape in parallel with each other along a center line toward the outside and are connected to a matching circuit 25, are arranged on the same plane and at opposite sides of a terminal connected to the matching circuit 25, and similarly, a second and a fourth antennas 22 and 24, in each of which both end portions of a coil bent like a substantially square loop shape extend from a substantially center point of a side of the substantially square shape in parallel with each other along a center line toward the outside and are connected to a matching circuit 26, are arranged on the same plane and at opposite sides of a terminal connected to the matching circuit 16, and further, the first antenna 21, the second antenna 22, the third antenna 23, and the fourth antenna 24 are arranged in this order on the same plane such that sides of the substantially square shapes are adjacent to each other.

In addition to the foregoing antenna assembly 10, the antenna apparatus includes a microcontroller 31, an oscillator 32, a transmitter 33, a receiver 34, distributors 35, 36 and 37, a phase inverter 38, and matching circuits 15, 16, 25 and 26. The microcontroller (control means) 31 is connected to a higher-level equipment such as a personal computer, and drives the antenna assemblies 10 and 20 on the basis of signals from this higher-level equipment. The microcontroller 31 controls the oscillator 32, generates a modulation signal in accordance with a signal from the higher-level equipment, and outputs it to the transmitter 33. The transmitter 33 modulates a carrier wave outputted from the oscillator 32 on the basis of the modulation signal outputted from the microcontroller 31, and generates a transmission signal. The transmission signal outputted from the transmitter 33 is distributed by the distributor 35 to the distributor 36 and the phase inverter 38. The transmission signal inputted to the distributor 36 is distributed to the output of the matching circuit 15 connected to the first and the third antennas 11 and 13 of the first antenna assembly 10, and the output of the matching circuit 25 connected to the first and the third antennas 21 and 23 of the second antenna assembly 20. The phase inverter 38 is controlled by a phase control signal outputted from the microcontroller 31. After the phase of the transmission signal inputted to this phase inverter 38 is inverted, the signal is distributed by the distributor 37 to the output of the matching circuit 16 connected to the second and the fourth antennas 12 and 14 of the first antenna assembly 10, and the output of the matching circuit 26 connected to the second and the fourth antennas 22 and 24 of the second antenna assembly 20. The signals received by the first antenna assembly 10 and the second antenna assembly 20 are guided to the receiver 34. A demodulation signal is outputted from the receiver 34 to the microcontroller 31, and a predetermined data processing is carried out.

Figure 3:
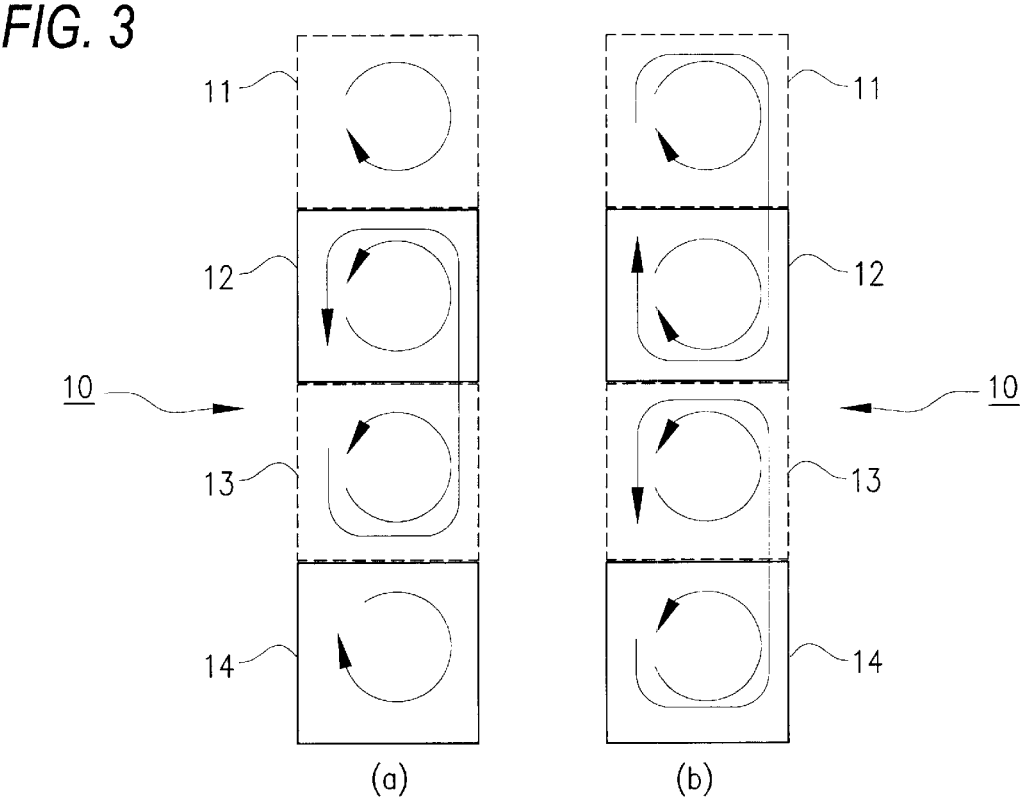
FIGS. 3A and 3B are views showing states of currents flowing to antenna assemblies under phase conditions of a pattern 1 and a pattern 2.

FIG. 3A shows a state of currents flowing to the respective antennas 11 to 14 under a phase condition of a pattern 1, and FIG. 3B shows a state of currents flowing to the respective antennas 11 to 14 under a phase condition of a pattern 2 (in both cases, the currents flow in the directions of arrows). Under the phase conditions of any patterns, the currents of phases reverse to each other flow to the first antenna 11 and the third antenna 13, and similarly, the currents of phases reverse to each other flow to the second antenna 12 and the fourth antenna 14. Under the phase condition of the pattern 1, the currents of phases identical to each other flow to the second antenna 12 and the third antenna 13, and the currents of phases identical to each other flow to the first antenna 11 and the fourth antenna 14. On the other hand, under the phase condition of the pattern 2, the currents of phases identical to each other flow to the first antenna 11 and the second antenna 12, and the currents of phases identical to each other flow to the third antenna 13 and the fourth antenna 14. That is, under the phase conditions of the pattern 1 and the pattern 2, the currents flowing to the second antenna 12 and the fourth antenna 14 have the phases reverse to each other, and such phase inversion is carried out for every unit of data communication (however, the timing of the phase inversion is not limited to this). Here, although the phases of the currents flowing to the second and the fourth antennas 12 and 14 are inverted, the phases of the currents flowing to the first and the third antennas 11 and 13 may be inverted. Besides, under any phase condition, the sum of the reverse phase current loops is always 0. Here, although only the first antenna assembly 10 has been described, the same applies to the second antenna assembly 20. As stated above, since the reverse phase currents are always made to flow between the first and the third antennas 11 and 13, and between the second and the fourth antennas 12 and 14, similarly to the conventional figure-of-eight type antenna, radio wave radiation at a remote place becomes minimum, and the intensity of an induction field in the vicinity of the antenna can be intensified. Further, the phases of the currents flowing to the second and the fourth antennas 12 and 14 are inverted between the pattern 1 and the pattern 2 so that the non-detection region appearing in the vicinity of the position where the antennas intersect with each other is complemented in time, and the non-detection region can be removed. Further, when the currents flowing to the first antenna assembly 10 and the second antenna assembly 20 are made to have a definite phase difference (for example, 90°), a rotating induction field can be generated in a region between the first and the second antenna assemblies 10 and 20 arranged to be opposite to each other as gates, and communication with tags (data carriers) existing in all directions in this region can be carried out.

Figure 4:
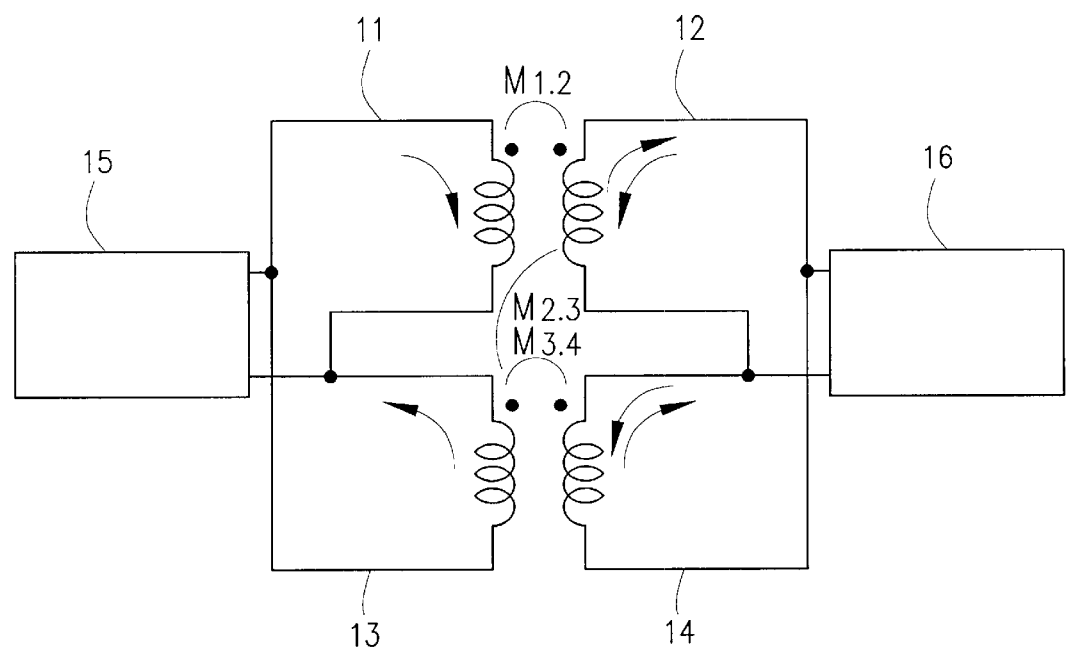
FIG. 4 is a view for explaining mutual inductances between respective antennas.

A mutual inductance between the first antenna 11 and the second antenna 12 is made $M_{1,2}$, a mutual inductance between the second antenna 12 and the third antenna 13 is made $M_{2,3}$, a mutual inductance between the third antenna 13 and the fourth antenna 14 is made $M_{3,4}$, and an inductance due to the mutual coupling of the whole of the antenna assembly 10 will be considered (see FIG. 4). At this time, since the mutual coupling between the first antenna 11 and the third antenna 13 or the fourth antenna 14, and between the second antenna 12 and the fourth antenna 14 is sufficiently low as compared with the mutual coupling between the adjacent antennas, the mutual inductances between these antennas can be neglected. Besides, since the shapes of the respective antennas and the conditions of the neighboring arrangement are equal to one another, the relation of $M_{1,2}=M_{2,3}=M_{3,4}$ is established.

Here, the mutual inductance of the whole of the antenna assembly 10 under the phase condition of the pattern 1 becomes $-M_{1,2}-M_{3,4}+M_{2,3}=-M$, and the mutual inductance of the whole of the antenna assembly 10 under the phase condition of the pattern 2 becomes $+M_{1,2}+M_{3,4}-M_{2,3}=+M$. As stated above, between the phase conditions of the pattern 1 and the pattern 2, since the signs of the mutual inductances are different from each other, matching conditions are also different from each other. Accordingly, equal antenna currents can not be made to flow in both the phase conditions.

Figure 5:
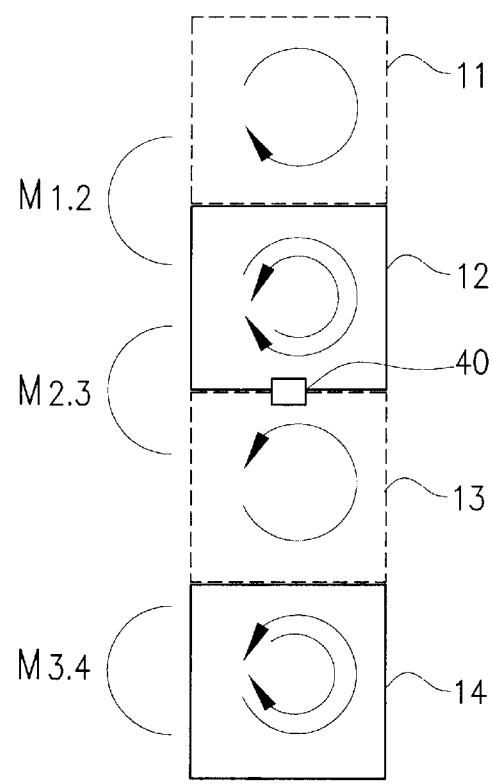
FIG. 5 is a view showing a state in which a coupling clamp is added to the antenna assembly.
Figure 6:
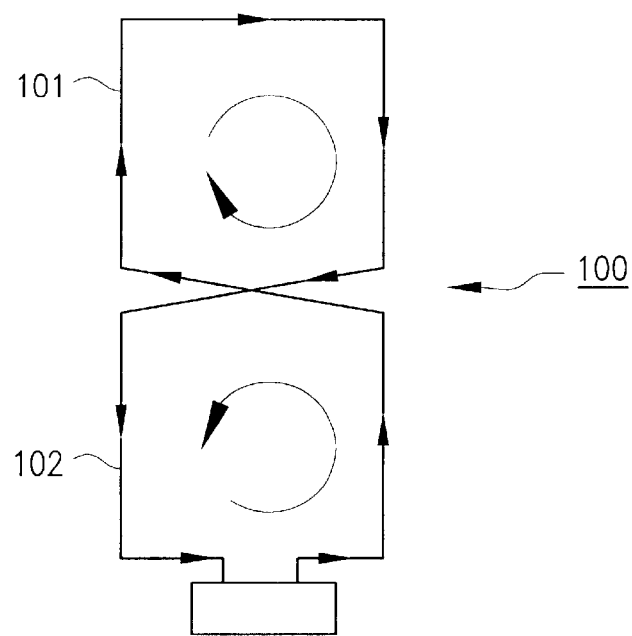
FIG. 6 is a view showing a conventional figure-of-eight type antenna.
Figure 7:
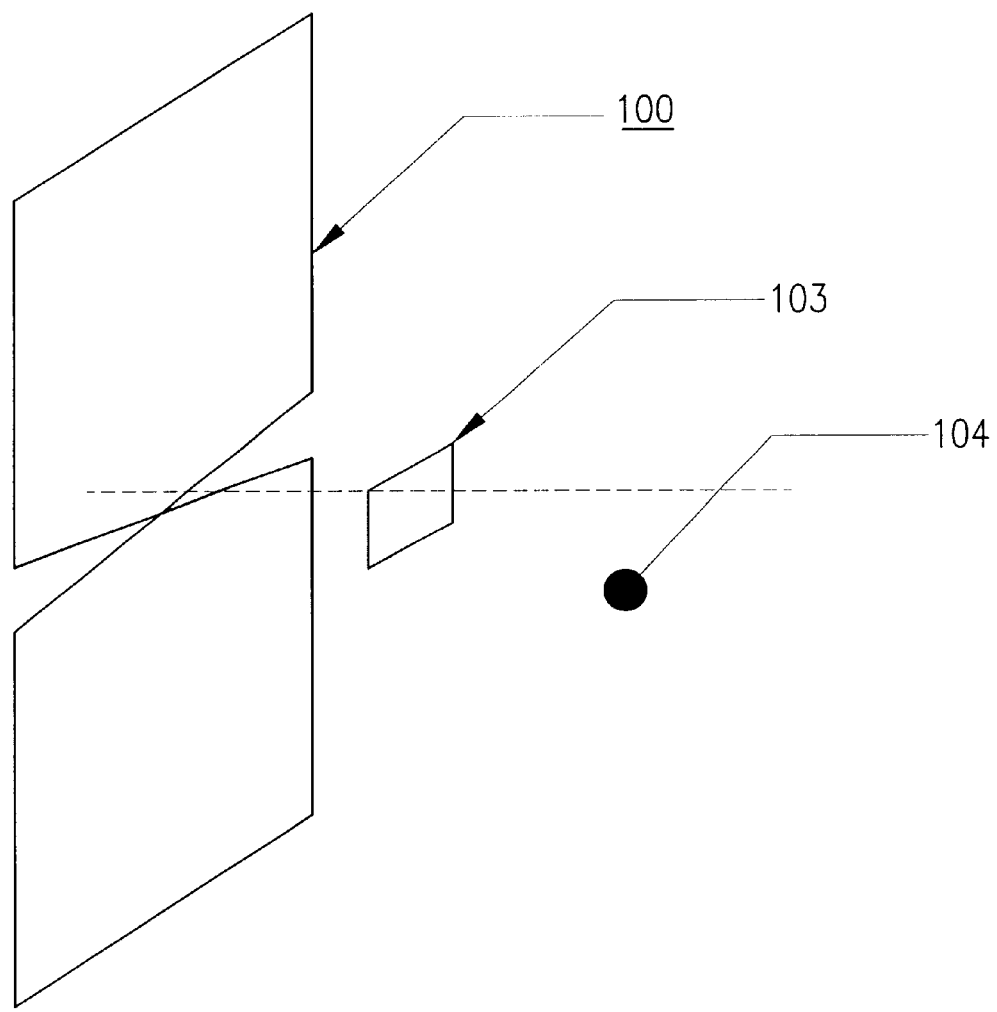
FIG. 7 is a view for explaining a problem of the prior art.

Thus, as shown in FIG. 5, coupling is made so that the mutual inductance between the second antenna 12 and the third antenna 13 is doubled by a coupling clamp 40 (inductance addition means) of a ferrite core or the like. By doing so, the mutual inductance of the whole of the antenna assembly 10 under the phase condition of the pattern 1 becomes $-M_{1,2}-M_{3,4}+2M_{2,3}+=0$, and the mutual inductance of the whole of the antenna assembly 10 under the phase condition of the pattern 2 also becomes $+M_{1,2}+M_{3,4}-2M_{2,3}=0$. Thus, the mutual couplings are cancelled, and the antenna currents can be made to flow under the same condition in both the phase conditions.

By doing so, the mutual couplings between the antennas, which occur in the case where the four antennas 11 to 14 are arranged to be adjacent to each other, are cancelled, and power feeding to be antennas can be efficiently made under any phase condition.

By using the antenna apparatus as stated above, even in the case where communication with a non-contact RF tag (data carrier) provided with an antenna and an IC chip including a memory is carried out, a non-detection region is made minimum, and the communication can be satisfactorily carried out over a wide range.

As described above, according to the antenna apparatus of the present invention, the non-detection region is made minimum within the regulatory limit of radio wave radiation, and satisfactory communication can be obtained over a wide range.

What is claimed is:

1. An antenna apparatus comprising:
   a first antenna assembly and a second antenna assembly arranged to be opposite to each other, for carrying out non-contact data communication with a data carrier, wherein each of the first and the second antenna assemblies includes a first, a second, a third, and a fourth antennas arranged to be adjacent to each other on a substantially same plane, said first and third antennas being mutually coupled in parallel, said second and forth antennas being mutually coupled in parallel and
   wherein the antenna apparatus comprises control means for controlling respective currents flowing in said antennas so that said currents flowing to the first antenna and the third antenna have phases reverse to each other, said currents flowing to the second antenna and the fourth antenna have phases reverse to each other, and the phases of the currents flowing to the first antenna and the third antenna, or the second antenna and the fourth antenna are inverted at a predetermined timing corresponding to the data communication.

2. An antenna apparatus according to claim 1, further comprising inductance addition means for adding an inductance equal to a mutual inductance between the second antenna and the third antenna.

3. An antenna apparatus according to claim 2, wherein each of the first, the second, the third, and the fourth antennas of each antenna assembly is a substantially rectangular loop antenna, and sides of adjacent loop antenna rectangles are substantially parallel to each other.

4. An antenna apparatus according to claim 1 or claim 2, wherein the control means provides a predetermined phase difference between the first antenna assembly and the second antenna assembly.

5. An antenna apparatus according to claim 4, wherein each of the first, the second, the third, and the fourth antennas of each antenna assembly is a substantially rectangular loop antenna, and sides of adjacent loop antenna rectangles are substantially parallel to each other.

6. An antenna apparatus according to claim 1, wherein each of the first, the second, the third, and the fourth antennas of each antenna assembly is a substantially rectangular loop antenna, and sides of adjacent loop antenna rectangles are substantially parallel to each other.

7. A method of detecting a data tag including an electronic device comprising:
   providing a gate antenna having a first antenna assembly disposed in spaced relation to a second antenna assembly, thereby defining a gate region therebetween, said first and second antenna assemblies each including at least four loop antennas;
   radiating an electro-magnetic field from said plurality of antenna assemblies, said electro-magnetic field having a first magnitude within said gate region and a second magnitude diminishing with distance from said plurality of antenna assemblies outside of said gate region, said electromagnetic field including a rotating magnetic field within said gate region;
   inducing an electrical current within said data tag by an action of said rotating magnetic field and thereby powering said electronic device;

and communicating with said electronic device by periodically inverting a phase of said radiated electromagnetic field.

8. A tag detector comprising:
an oscillator adapted to generate a first signal;
a modulator operatively connected to said oscillator, said modulator adapted to modulate said first signal and produce a modulated second signal;
a transmitter operatively connected to said modulater, said transmitter adapted to transmit said modulated second signal; and
a gate antenna operatively connected to said transmitter, said gate antenna adapted to radiate said transmitted modulated second signal, said gate antenna including:
first and second antenna assemblies, said first antenna assembly including four loop antennas disposed in substantially coplanar relation to one another, said second antenna assembly including four further loop antennas disposed in substantially coplanar relation to one another, said first and second antenna assemblies disposed in substantially parallel spaced relation to one another, said transmitter adapted to drive an instantaneous current through said antennas such that said first and third antennas operate consistently out of phase with one another and said second and forth antennas alternate phase with respect to said first and second antennas and with respect to one another.

9. A tag detector as defined in claim 8, wherein said modulator further comprises a microcontroller.

10. A tag detector as defined in claim 8 further comprising a distributor electrically disposed between said transmitter and one of said antenna assemblies.

11. A tag detector as defined in claim 10 further comprising a matching circuit electrically disposed between said distributor and said one of said antenna assemblies.

12. A data tag detection device comprising:
a primary antenna assembly including four loop antennas disposed in substantially coplanar relation to one another, said four loop antennas each defining a respective center point, said center points disposed in substantially collinear relation to one another; and
a signal generation circuit operatively connected to said primary antenna assembly and adapted to supply electrical current to said primary antenna assembly such that a first time a first one of said antennas conducts a clockwise electrical current, a second one of said antennas adjacent said first antenna conducts a counterclockwise electrical current, a third one of said antennas adjacent said second one of said antennas conducts a counterclockwise electrical current, and a fourth one of said antennas adjacent said third one of said antennas conducts a clockwise electrical current.

13. A data tag detection device, as defined in claim 12 wherein said signal generation circuit is further adapted to supply electrical current to said primary antenna assembly such that at a second time, said second and fourth antennas each conduct a respective clockwise current and counterclockwise current.

14. A data tag detection device, as defined in claim 13, further comprising a further antenna assembly having a structure similar to said primary antenna assembly whereby each antenna of said primary antenna assembly corresponds to a further antenna in said further antenna assembly, said further antenna assembly disposed in substantially parallel spaced relation to said primary antenna assembly.

15. A data tag detection device as defined in claim 13, wherein said signal generation circuit is operatively connected to said further antenna assembly and adapted to supply electrical current to said further antenna assembly such that at said first time each antenna of said further antenna assembly conducts a respective current out of phase with the respective current in the corresponding antenna of said primary antenna assembly.

16. A data tag detection device as defined in claim 12 further comprising a receiver adapted to detect a signal broadcast by a data tag including an integrated circuit, said data tag disposed between said primary antenna assembly and said further antenna assembly.

17. A method of detecting a noncontact data tag comprising:
driving first and third antennas with a first signal;
driving second and fourth antennas with a second signal, said first, second, third, and fourth antennas disposed in substantially coplanar relation to one another and interleaved such that said second antenna is disposed adjacent said first and third antennas and said third antenna is disposed adjacent said second and fourth antennas;
driving fifth and seventh antennas with a third signal;
driving sixth and eighth antennas with a fourth signal, said fifth, sixth, seventh, and eighth antennas disposed in substantially coplanar relation to one another and interleaved such that said sixth antenna is disposed adjacent said fifth and seventh antennas and said seventh antenna is disposed adjacent said sixth and eighth antennas, said fifth, sixth, seventh and eighth antennas disposed in substantially parallel spaced relation to said first, second, third and fourth antennas respectively;
controlling said first and second signals to be substantially identical to one another in amplitude and form and approximately 180° out of phase with one another; and
controlling said third and fourth signals to be substantially identical to one another in amplitude and form and approximately 180° out of phase with one another.

18. A method of detecting a data tag as defined in claim 17 further comprising:
controlling said first and third signals to be substantially identical to one another in amplitude and form and out of phase with one another and thereby generating a rotating magnetic field data in a gate region defined on a first side side by said first, second, third and fourth antennas and defined on a second opposite side by said fifth, sixth, seventh, and eighth antennas.

19. A method of detecting a data tag as defined in claim 18 wherein driving said antennas with said respective signals generates an electromagnetic field having a first magnitude within said gate region and a magnitude diminishing with distance from said gate region in a further region outside of said gate region.

20. A method of detecting a data tag as defined in claim 18 further comprising:
introducing an RF tag into said gate region; and
detecting said RF tag within said gate region.

21. A method of detecting a data tag as defined in claim 18 wherein said antennas each comprise a loop antenna.

22. A method of detecting a data tag as defined in claim 21 wherein each said loop antenna comprises a substantially rectangular loop antenna.

23. A method of detecting a data tag as defined in claim 22 wherein each said loop antenna comprises a substantially square loop antenna.

24. A method of detecting a data tag as defined in claim 18 wherein driving said antennas with said respective signals comprises:
- generating said signals in a microcontroller;
- communicating said signals from said microcontroller to a transmitter;
- transmitting said signals from said transmitter to said respective antennas by way of a respective plurality of distributors and a respective plurality of matching circuits.

25. A method of detecting a data tag as defined in claim 24 wherein said generating a signal comprises:
- producing a carrier signal from an oscillator; and
- modulating the said carrier signal with said microcontroller, wherein said modulating includes inverting a phase of said carrier signal according to a message to be communicated.

* * * * *